(12) United States Patent
Chen

(10) Patent No.: US 12,437,011 B2
(45) Date of Patent: Oct. 7, 2025

(54) RECOMMENDED CONTENT SELECTION METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventor: Hao Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 9 days.

(21) Appl. No.: 18/214,323

(22) Filed: Jun. 26, 2023

(65) Prior Publication Data

US 2023/0359678 A1 Nov. 9, 2023

Related U.S. Application Data

(63) Continuation of application No. PCT/CN2022/120896, filed on Sep. 23, 2022.

(30) Foreign Application Priority Data

Nov. 19, 2021 (CN) .......................... 202111374350.0

(51) Int. Cl.
*G06F 16/9535* (2019.01)
*G06F 16/735* (2019.01)
*G06F 16/9035* (2019.01)

(52) U.S. Cl.
CPC ........ *G06F 16/9535* (2019.01); *G06F 16/735* (2019.01); *G06F 16/9035* (2019.01)

(58) Field of Classification Search
CPC ............. G06F 16/9535; G06F 16/9035; G06F 16/735; G06F 18/25; G06F 16/951;
(Continued)

(56) References Cited

U.S. PATENT DOCUMENTS

2017/0212929 A1* 7/2017 Sundaresan ......... G06F 16/2228
2019/0286752 A1* 9/2019 Leskovec ................. G06N 3/08
2021/0209446 A1 7/2021 Shi et al.

FOREIGN PATENT DOCUMENTS

CN 110569437 A * 12/2019 ......... G06F 16/9535
CN 110795619 A * 2/2020 ......... G06F 16/9535
(Continued)

OTHER PUBLICATIONS

Matakos et al., Article: "Tell me something my friends do not know: Diversity maximization in social networks" ARXIV ID: 1811.10354 Publication Date: Nov. 26, 2018 ARXIV Article; arxiv.org (Year: 2018).*

(Continued)

*Primary Examiner* — Evan Aspinwall
(74) *Attorney, Agent, or Firm* — Morgan, Lewis & Bockius LLP

(57) ABSTRACT

A recommended content selection method is performed by a computer device. The method includes: obtaining an input structure graph for representing associations between user nodes and content nodes; generating fusion vectors corresponding to nodes in the input structure graph using an interactive prediction model, a fusion vector corresponding to a target node integrates feature information of the target node and feature information of another node associated with the target node; determining, for a target user node, interactive prediction values between the target user node and the plurality of content nodes based on a fusion vector corresponding to the target user node and fusion vectors corresponding to the plurality of content nodes; and selecting a recommended content node from the plurality of content nodes according to the interactive prediction values between the target user node and the plurality of content (Continued)

nodes and a diversity index of a recommended content node set.

14 Claims, 8 Drawing Sheets

(58) Field of Classification Search
    CPC .... G06F 16/9536; G06F 16/738; G06F 16/75; G06F 16/435; G06N 20/00; G06N 3/08
    USPC .......................................................... 707/706
    See application file for complete search history.

(56) References Cited

FOREIGN PATENT DOCUMENTS

| CN | 111382309 A | * | 7/2020 | ........... G06F 16/735 |
|---|---|---|---|---|
| CN | 111400560 A | | 7/2020 | |
| CN | 111522962 A | | 8/2020 | |
| CN | 111523047 A | | 8/2020 | |
| CN | 111681059 A | | 9/2020 | |
| CN | 111814048 A | | 10/2020 | |
| CN | 112905900 A | | 6/2021 | |
| CN | 113362131 A | | 9/2021 | |
| CN | 113515701 A | | 10/2021 | |

OTHER PUBLICATIONS

Wang II et all, Article: Personalized Re-ranking for Improving Diversity in Live Recommender Systems ARXIV ID: 2004.06390 Publication Date: Apr. 14, 2020; ARXIV Article; arxiv.org (Year: 2020).*

Tencent Technology, ISR, PCT/CN2022/120896, Dec. 15, 2022, 4 pgs.

Tencent Technology, WO, PCT/CN2022/120896, Dec. 15, 2022, 5 pgs.

Tencent Technology, IPRP, PCT/CN2022/120896, May 2, 2024, 6 pgs.

* cited by examiner

RECOMMENDED CONTENT SELECTION METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/120896, entitled "RECOMMENDED CONTENT SELECTION METHOD AND APPARATUS, DEVICE, STORAGE MEDIUM, AND PROGRAM PRODUCT" filed on Sep. 23, 2022, which claims priority to Chinese Patent Application No. 202111374350.0, entitled "RECOMMENDED CONTENT SELECTION METHOD AND APPARATUS, DEVICE, STORAGE MEDIUM, AND PROGRAM PRODUCT" filed on Nov. 19, 2021, all of which is incorporated by reference in its entirety.

FIELD OF THE TECHNOLOGY

Embodiments of this application relate to the field of artificial intelligence and Internet technology, and in particular, to a recommended content selection method and apparatus, a device, a storage medium, and a program product.

BACKGROUND OF THE DISCLOSURE

With the development of artificial intelligence technology, a recommendation system may select contents in which a user is interested from mass information and may recommend the contents to the user, so as to meet user needs.

For example, in a video recommendation scene, in the related art, a corresponding unique identification code between the user and a video is mapped into a certain space by matrix decomposition to obtain a word embedding vector corresponding to the user and a word embedding vector corresponding to the video. An interaction possibility between the user and the video is predicted by an inner product between the word embedding vector corresponding to the user and the word embedding vector corresponding to the video, and then the video with a high interaction possibility is recommended to the user.

However, the similarity between videos recommended in the related art is high, and the diversity of video recommendation is poor.

SUMMARY

Embodiments of this application provide a recommended content selection method and apparatus, a device, a storage medium, and a program product. The technical solutions are as follows:

According to one aspect of the embodiments of this application, a recommended content selection method is performed by a computer device. The method includes:
  obtaining an input structure graph, the input structure graph including a plurality of user nodes and a plurality of content nodes;
  generating, according to the input structure graph, fusion vectors corresponding to nodes in the input structure graph using an interactive prediction model, a fusion vector corresponding to a target node among the nodes integrating feature information of the target node and feature information of a node associated with the target node;
  determining, for a target user node among the plurality of user nodes, interactive prediction values between the target user node and the plurality of content nodes based on a fusion vector corresponding to the target user node and fusion vectors corresponding to the plurality of content nodes; and
  selecting a recommended content node from the plurality of content nodes according to the interactive prediction values between the target user node and the plurality of content nodes and a diversity index of a recommended content node set.

According to one aspect of the embodiments of this application, a computer device is provided. The computer device includes a processor and a memory. The memory stores a computer program. The computer program is loaded and executed by the processor and causes the computer device to implement the foregoing recommended content selection method or the foregoing information fusion method.

The computer device is a terminal or a server.

According to one aspect of the embodiments of this application, a non-transitory computer-readable storage medium is provided. The computer-readable storage medium stores a computer program. The computer program is loaded and executed by a processor of a computer device and causes the computer device to implement the foregoing recommended content selection method or the foregoing information fusion method.

A recommended content node is selected from a plurality of content nodes by combining interactive prediction values between user nodes and the content nodes and a diversity index of a set composed of recommended content nodes, and the correlation between the recommended content node and the user nodes and the diversity of the recommended content node are comprehensively considered, thereby improving the diversity of a recommended content while the recommended content is correlated with a user.

DESCRIPTION OF EMBODIMENTS

The technical solutions provided by the embodiments of this application relate to computer vision technology of artificial intelligence. The computer vision technology is used for training an interactive prediction model, and predicting an interaction possibility between a user and content based on the trained interactive prediction model.

The execution entity for the steps of a method provided by the embodiments of this application may be a computer device. The computer device refers to an electronic device with data computing, processing and storage capabilities. The computer device may be a terminal such as a personal computer (PC), a tablet computer, a smartphone, a wearable device, or a smart robot. The computer device may also be a server. The server may be an independent physical server, may also be a server cluster or distributed system composed of a plurality of physical servers, and may also be a cloud server providing cloud computing services.

The technical solutions provided by the embodiments of this application are applicable to any scenario requiring content recommendation, such as a recommendation system, a content recommendation scenario, a content retrieval scenario, or a content recall scenario. The content may include items, videos, information, news, and the like. The technical solutions provided by the embodiments of this application can improve the diversity of a recommended content while the recommended content is correlated with a user.

Figure 1:
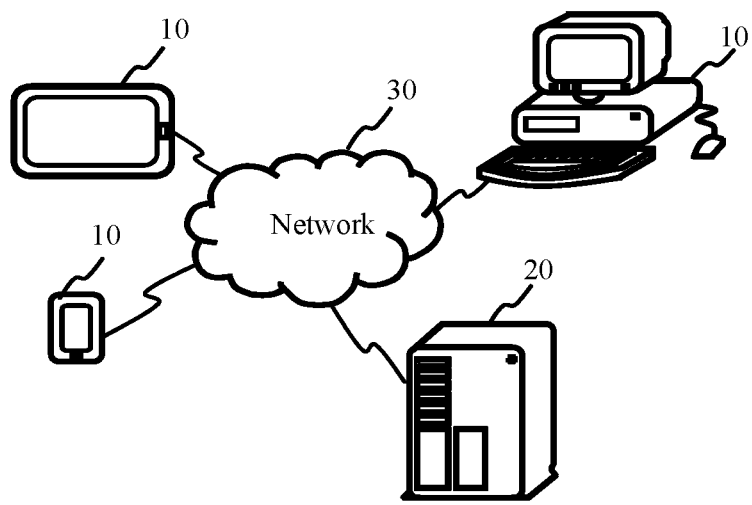
FIG. 1 is a schematic diagram of a scheme implementation environment according to an embodiment of this application.

In one example, as shown in FIG. 1, a recommendation system is adopted. The system may include a terminal 10 and a server 20.

The terminal 10 may be an electronic device such as a mobile phone, a digital camera, a tablet computer, a PC, or a wearable device. A client of a target application may be installed in the terminal 10, and a user may perform operations such as content retrieval, content browsing, and content recall via the client. The target application may be a content recommendation application, a shopping application, a browser application, an entertainment application, and the like. The embodiments of this application are not limited thereto. Exemplarily, the terminal 10 may also be referred to as a terminal device 10.

The server 20 may be an independent physical server, may also be a server cluster or distributed system composed of a plurality of physical servers, and may also be a cloud server providing cloud computing services. The server 20 is configured to provide a background service for the client of the target application in the terminal 10. For example, the server 20 may be a background server of the target application (such as the content recommendation application).

The terminal 10 may communicate with the server 20 by using a network 30.

Exemplarily, the content is a video. A user browses a video in the client of the target application. The client transmits historical interaction information between the user and the video to the server 20. The server 20 determines the correlation between the user and the video (for example, through a trained interactive prediction model) based on the historical interaction information, selects the video based on the correlation between the user and the video and the diversity of the video, and then recommends the selected video to the user via the client.

Certainly, in some other examples, the video selection process may also be performed in the terminal 10, such as in the client of the target application. For example, the client may directly obtain the correlation between the user and the video based on the historical interaction information between the user and the video, and then select the video based on the correlation between the user and the video and the diversity of the video. The embodiments of this application are not limited thereto.

Figure 2:
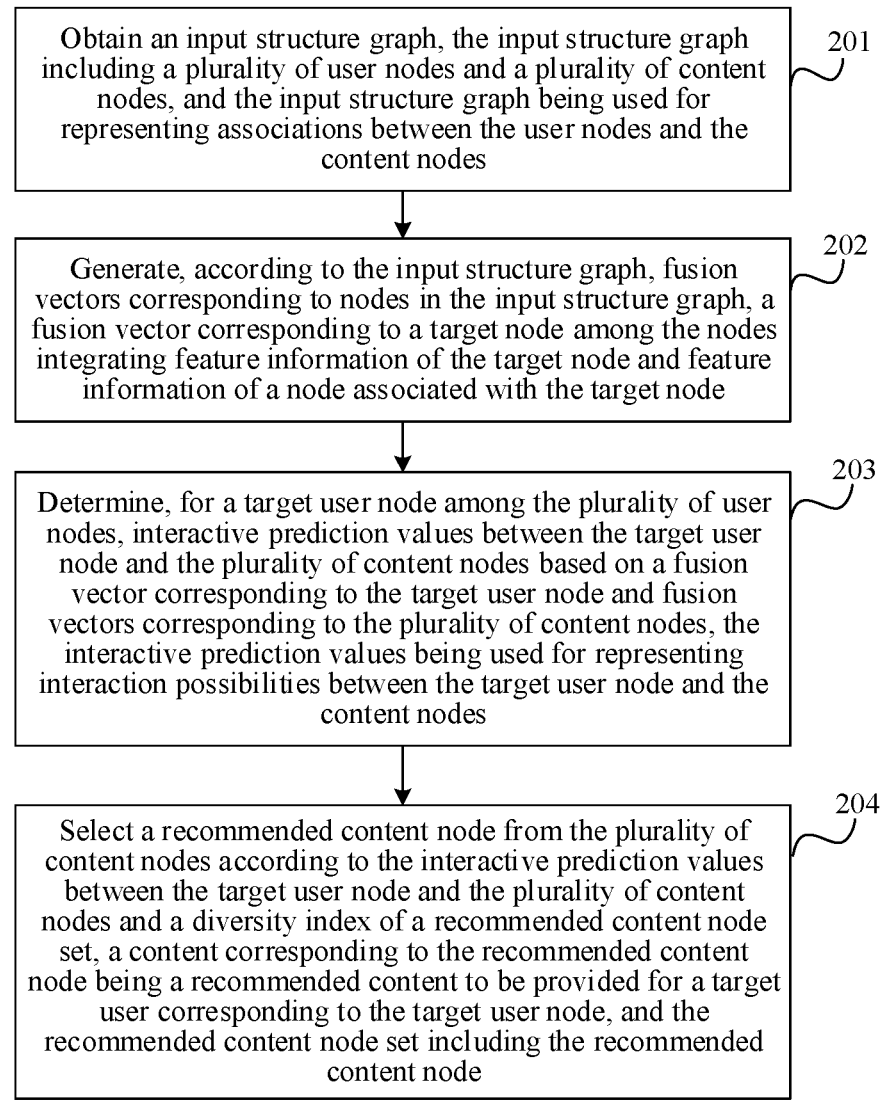
FIG. 2 is a flowchart of a recommended content selection method according to an embodiment of this application.
Figure 3:
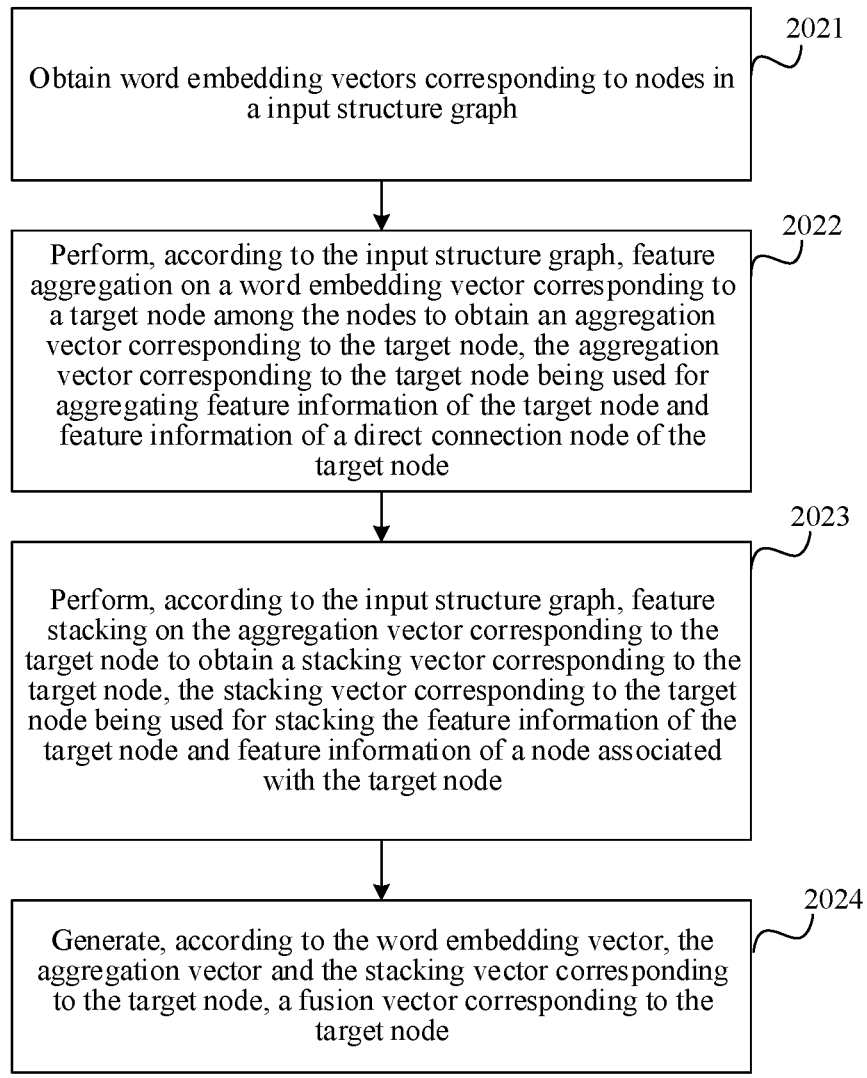
FIG. 3 is a flowchart of a fusion vector obtaining method according to an embodiment of this application.
Figure 4:
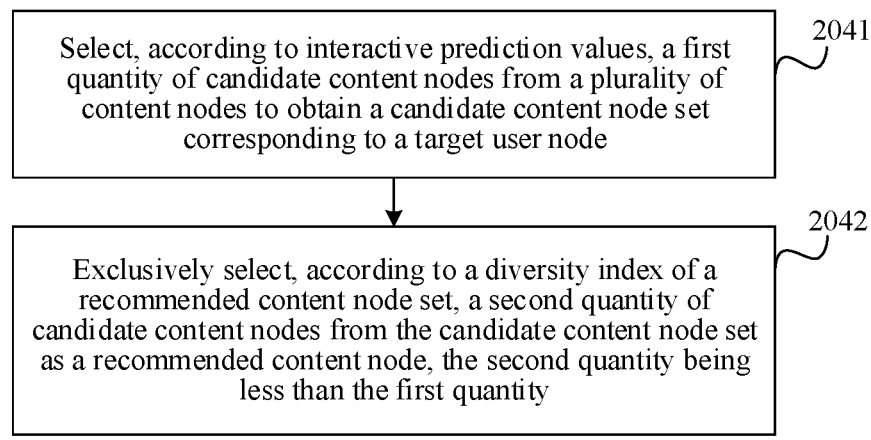
FIG. 4 is a flowchart of a recommended content node selection method according to an embodiment of this application.

FIG. 2 shows a flowchart of a recommended content selection method according to an embodiment of this application. The execution entity for the steps of the method may be the terminal 10 or the server 20 in the scheme implementation environment shown in FIG. 1. The method may include at least one of the following steps (201-204):

Step 201: Obtain an input structure graph, the input structure graph including a plurality of user nodes and a plurality of content nodes, and the input structure graph being used for representing associations between the user nodes and the content nodes.

A structure graph is a graph model in a graph theory that divides a node in a graph into two non-intersect subsets. The structure graph may also be referred to as a bigraph, a binary graph, a bipartite graph, or the like. In this embodiment of this application, the input structure graph refers to a structure graph with a user node as one subset and a content node as another subset. The user node and the content node may be connected across subsets by a connecting edge. The input structure graph may be used for describing an interaction relationship between a user and content. The user node is used for representing the user. The user node may be identified based on identification information, attribute information, and the like of the user. The content node is used for representing the content. The content node may be identified based on the identification information, attribute information, and the like of the content.

The input structure graph may explicitly describe potential associations between the various nodes in the input structure graph. For example, the content is a video. For user node 1 among a plurality of user nodes, there is an interaction relationship between user node 1 and video node 1 and video node 2 (namely, video node 1 and video node 2 are direct connection nodes of user node 1). Meanwhile, there is an interaction relationship between user node 2 and video node 1, and it may be considered that there is a potential association between user node 2 and user node 1 (namely, user node 2 is a coordinated signal corresponding to user node 1). Other nodes connected to a node only through one connecting edge are direct connection nodes of the node.

In some embodiments, the input structure graph may be constructed based on historical interaction information between the user and the content. The historical interaction information may refer to historical interaction information between the user and the content in any application. The content may include items, videos, music, news, information, and the like. This embodiment of this application is not limited to the content.

Exemplarily, the content is a video. The process of constructing an input structure is described specifically as follows: Historical interaction information between a user and a video in a video viewing application is obtained. The user may refer to all users in the video viewing application. The video may refer to all videos in the video viewing application which have an interaction relationship with the users. A user set and a video set are determined based on the historical interaction information, and a user node set and a video node set are generated based on the user set and the video set. A user node is identified with a unique identification code of the user in the video viewing application, and a video node is identified with a unique identification code of the video in the video viewing application. Finally, a connecting edge between the user node and the video node is determined based on the historical interaction information, so as to generate an input structure graph corresponding to the video viewing application.

Step 202: Generate, according to the input structure graph, fusion vectors corresponding to nodes in the input structure graph, a fusion vector corresponding to a target node among the nodes integrating feature information of the target node and feature information of a node associated with the target node.

Each node refers to each user node and each content node. That is, a fusion vector corresponding to each user node and a fusion vector corresponding to each content node in the input structure graph are generated. The target node may refer to any node among the nodes (including the user nodes and the content nodes). The fusion vector of the target node is fused with feature information of a node having a potential association with the target node. The node having the potential association with the target node may include a user node and a content node. That is, a node which can be connected to the target node via a connecting edge may be determined as the node having the potential association with the target node. Exemplarily, based on the foregoing example, the fusion vector of user node 1 may be fused with: feature information of video node 1 and video node 2 (direct connection nodes), feature information of user node 2 (potentially associated nodes), and feature information of user node 1.

In one example, the process of specifically obtaining fusion vectors may include at least one of the following steps (2021-2024):

Step 2021: Obtain word embedding vectors corresponding to the nodes in the input structure graph.

The word embedding vectors may be used for representing the nodes. For example, the word embedding vector of the user node represents unique identification information corresponding to the user node in the form of a digital vector. Exemplarily, each user node and each video node may be projected into a d-dimensional vector space using a d-dimensional word embedding vector so as to represent each user node and each video node. In this way, a word embedding vector look-up table E corresponding to the input structure graph may be obtained. E may be expressed as follows:

$$E=[e_{u_1}, e_{u_2}, \cdots, e_{u_n}, e_{c_1}, e_{c_2}, \cdots, e_{c_m}],$$

where $e_{u_1}, e_{u_2}, \ldots, e_{u_n}$ is the word embedding vector corresponding to the user node, $e_{c_1}, e_{c_2}, \ldots, e_{c_m}$ is the word embedding vector corresponding to the content node, $e_{u_n}$ is the word embedding vector corresponding to an $n^{th}$ user node, and $e_{c_m}$ is the word embedding vector corresponding to an $m^{th}$ content node. d is a hyper-parameter, which may be set according to the experience of a developer. Generally, as the value of d is higher, more feature information of the node is retained. However, the computation complexity of a high-dimensional word embedding vector is relatively high. In this way, the developer is required to balance the two aspects to determine the value of d.

Step 2022: Perform, according to the input structure graph, feature aggregation on a word embedding vector corresponding to the target node among the nodes to obtain an aggregation vector corresponding to the target node, the aggregation vector corresponding to the target node being used for aggregating the feature information of the target node and the feature information of a direct connection node of the target node.

The aggregation vector refers to a vector obtained by performing feature aggregation on the word embedding vector corresponding to the node and the word embedding vector corresponding to the direct connection node (which may also be referred to as a first-order neighbor node) of the node. For example, based on the foregoing example, the aggregation vector corresponding to user node 1 is a vector obtained by performing feature aggregation on the word embedding vector (namely, feature information) corresponding to user node 1, the word embedding vector corresponding to video node 1 (direct connection node), and the word embedding vector corresponding to video node 2 (direct connection node). By feature aggregation, feature information of a direct connection node of a node may be injected into a word embedding vector of the node, so as to associate the node with the direct connection node of the node.

In one example, the process of specifically obtaining aggregation vectors may be as follows: determining, according to the input structure graph, a direct connection node set corresponding to the target node; performing, for a target direct connection node in the direct connection node set, element multiplication on the word embedding vector corresponding to the target node and a word embedding vector corresponding to the direct connection node to obtain a first intermediate vector; performing weighted summation on the first intermediate vector and the word embedding vector corresponding to the direct connection node to obtain a second intermediate vector corresponding to the target direct connection node; summing the second intermediate vectors corresponding to the direct connection nodes in the direct connection node set to obtain a third intermediate vector; and performing feature aggregation on the word embedding vector corresponding to the target node and the third intermediate vector to obtain the aggregation vector corresponding to the target node.

The method for obtaining the aggregation vector corresponding to the user node is the same as the method for obtaining the aggregation vector corresponding to the content node. Taking the user node as an example, the process of obtaining the aggregation vector corresponding to the user node may also be expressed by the following formula:

$$e_u^1 = \text{Leaky}ReLU(W_1 e_u + \sum_{c \in N_u} \frac{1}{\sqrt{|N_u||N_c|}} (W_1 e_c + W_2(e_c \odot e_u))),$$

where $e_u^1$ is the aggregation vector corresponding to user node u, LeakyReLU is an activation function, $W_1$ and $W_2$ are trainable weight parameters corresponding to the aggregation vector, which are used for extracting effective feature information, $W_1$ and $W_2$ are matrices of d'×d, the value of d is the same as the dimension of the word embedding vector, d' is the size after d conversion (namely, a conversion dimension), $e_u$ is the word embedding vector corresponding to user node u, $N_u$ is the direct connection node set of user node u, $e_c$ is the word embedding vector corresponding to a $c^{th}$ direct connection node in the direct connection node set of user node u, and $N_c$ is the direct connection node set including the $c^{th}$ direct connection node of user node u. $e_c \odot e_u$ represents pair-wise element multiplication of $e_c$ and $e_u$, which may be used for representing the similarity between user node u and direct connection node c. That is, the formula can aggregate more information similar to and relevant to user node u into the fusion vector of user node u.

Step 2023: Perform, according to the input structure graph, feature stacking on the aggregation vector corresponding to the target node to obtain a stacking vector corresponding to the target node, the stacking vector corresponding to the target node being used for stacking the feature information of the target node and the feature information of the node associated with the target node.

The stacking vector is a vector obtained by performing feature stacking on a stacking vector corresponding to a node and a stacking vector of a direct connection node of the node. By feature stacking, feature information of a node potentially associated with a node may be injected into a word embedding vector of the node to associate the node, potentially associated with the node, with the node.

In some embodiments, the stacking vector includes m-order stacking vectors, m being a positive integer greater than 1. The aggregation vector may also be referred to as a first-order stacking vector corresponding to a node. Based on the first-order stacking vector of a direct connection node of the node, a second-order stacking vector of the node may be obtained. Based on the second-order stacking vector of the direct connection node of the node, a third-order stacking vector of the node may be obtained. By analogy, an $m^{th}$-order stacking vector of the node may be obtained. The first-order stacking vector aggregates a word embedding vector (feature information) of a direct connection node (first-order neighbor node) of a node. The second-order stacking vector aggregates a first stacking vector of the first-order neighbor node. The first stacking vector of the first-order neighbor node aggregates a word embedding vector of a direct connection node (corresponding to a second-order neighbor node of the node) of the first-order neighbor node. The second-order neighbor node is connected to the node through two connecting edges, which may be described as: node-connecting edge-first-order neighbor node-connecting edge-second-order neighbor node. By the same reasoning, the $m^{th}$-order stacking vector aggregates a word embedding vector of an $m^{th}$-order neighbor node of the node. In this way, by feature stacking, feature information of an $m^{th}$-order neighbor node of a node may be injected into a word embedding vector of the node, thereby associating the node with the $m^{th}$-order neighbor node of the node.

In one example, the process of obtaining stacking vectors may be as follows: determining, according to the input structure graph, a direct connection node set corresponding to the target node; performing, when p is equal to 2, feature stacking on the aggregation vector corresponding to the target node and aggregation vectors corresponding to the direct connection nodes in the direct connection node set to obtain a second-order stacking vector corresponding to the target node, for a $p^{th}$-order stacking vector among the m-order stacking vectors, p being a positive integer less than or equal to m; and performing, when p is greater than 2, feature stacking on a $(p-1)^{th}$-order stacking vector corresponding to the target node and $(p-1)^{th}$-order stacking vectors corresponding to the direct connection nodes to obtain the $p^{th}$-order stacking vector corresponding to the target node.

Exemplarily, based on the foregoing example, after obtaining an aggregation vector (namely, first-order stacking vector) corresponding to user node 1, an aggregation vector corresponding to video node 1, an aggregation vector corresponding to video node 2, and aggregation vector corresponding to user node 2, feature stacking is performed on the aggregation vector corresponding to user node 1, the aggregation vector corresponding to video node 1, and the aggregation vector corresponding to video node 2. That is, a second-order stacking vector corresponding to user node 1 may be obtained. By the same method, a second-order stacking vector corresponding to video node 1 is obtained based on an aggregation vector corresponding to video node 1 and an aggregation vector corresponding to a first-order neighbor node of video node 1. A second-order stacking vector corresponding to video node 2 is obtained based on an aggregation vector corresponding to video node 2 and an aggregation vector corresponding to a first-order neighbor node of video node 2. Then, feature stacking is performed on the second-order stacking vector corresponding to user node 1, the second-order stacking vector corresponding to video node 1, and the second-order stacking vector corresponding to video node 2. A third-order stacking vector corresponding to user node 1 may be obtained.

The method for obtaining the stacking vector of the user node is the same as the method for obtaining the stacking vector of the content node. Taking the user node as an example, the process of obtaining the $p^{th}$-order stacking vector of the user node may also be expressed by the following formula:

$$e_u^{(p)} = \text{LeakyReLu}(W_1^{(p)} e_u^{(p-1)} + \sum_{c \in N_u} \frac{1}{\sqrt{|N_u||N_c|}} (W_1^{(p)} e_c^{(p-1)} + W_2^{(p)}(e_c^{(p-1)} \odot e_u^{(p-1)})))$$

where $e_u^{(p)}$ is the $p^{th}$-order stacking vector corresponding to user node u, p is an integer greater than 1, LeakyReLU is the activation function, $W_1^{(p)}$ and $W_2^{(p)}$ are trainable weight parameters corresponding to the $p^{th}$-order stacking vector, which are used for extracting effective feature information, $W_1^{(p)}$ and $W_2^{(p)}$ are matrices of d'×d, the value of d is the same as the dimension of the word embedding vector, d' is the size after d conversion (namely, a conversion dimension), $e_u^{(p-1)}$ is a $(p-1)^{th}$-order stacking vector corresponding to user node u, $N_u$ is the direct connection node set of user node u, $e_c^{(p-1)}$ is the $(p-1)^{th}$-order stacking vector of a $c^{th}$ direct connection node in the direct connection node set of user node u, and $N_c$ is the direct connection node set including the $c^{th}$ direct connection node of user node u. $e_c^{(p-1)} \odot e_u^{(p-1)}$ represents pair-wise element multiplication of $e_c^{(p-1)}$ and $e_u^{(p-1)}$. The formula can aggregate feature information of multi-order neighbor nodes of the user node into the stacking vector corresponding to user node u.

In one example, the process of obtaining the $p^{th}$-order stacking vector of the node may also be converted to a matrix form, which may be expressed as follows:

$$E^{(p)} = \text{LeakyReLU}((\mathcal{L}+I)E^{(p-1)}W_1^{(p)} + \mathcal{L}E^{(p-1)} \odot E^{(p-1)}W_2^{(p)}),$$

where $E^{(p)}$ is the matrix form of the $p^{th}$-order stacking vector of the node (including the user node and the content node), which may be denoted as $E^{(p)} \in \mathbb{R}^{(|U|+|C|)*d}$, U is the user node set, C is the content node set, and $d_p$ is the length of stacking. $\mathcal{L}$ is the Laplacian matrix, $$\mathcal{L} = D^{-\frac{1}{2}} A D^{-\frac{1}{2}}, A = \begin{bmatrix} 0 & R \\ R^T & 0 \end{bmatrix},$$

D is a diagonal matrix, and diagonal elements of D are row sums and/or column sums of A. $R \in \mathbb{R}^{|U|+|C|}$, where R is an interaction matrix of the user node and the content node. For example, $R_{uc}=1$ indicates that an interaction is observed between user node u and content node c. $R_{uc}=0$ indicates that no interaction is observed between user node u and content node c. $R^T$ is the transpose of R, I is an identity matrix, 0 is an all-zero matrix, $E^{(p-1)}$ is the matrix form of the $(p-1)^{th}$-order stacking vector of the node, and $W_1^{(p)}$ and $W_2^{(p)}$ are trainable weight parameter corresponding to the $p^{th}$-order stacking vector.

Step 2024: Generate, according to the word embedding vector, the aggregation vector and the stacking vector corresponding to the target node, a fusion vector corresponding to the target node.

In some embodiments, the fusion vector corresponding to the target node may be obtained by concatenating the word embedding vector, the aggregation vector and the m-order stacking vectors corresponding to the target node.

Exemplarily, after performing m-order feature stacking on the target node using a mode of obtaining the stacking vector in the matrix form, a matrix representation of a one-order stacking vector may be obtained: $E^{(1)}, E^{(2)}, \ldots, E^{(m)}$, where $E^{(1)}$ may be understood as a matrix representation of the aggregation vector corresponding to the target node. Then the one-order stacking vector corresponding to the target node is: $e^{(1)}, e^{(2)}, \ldots, e^{(m)}$. By concatenating $e^{(0)}, e^{(1)}, e^{(2)}, \ldots, e^{(m)}$, the fusion vector corresponding to the target node may be obtained. $e^{(0)}$ may be understood as the word embedding vector corresponding to the target node, $e^{(1)}$ may be understood as the aggregation vector corresponding to the target node, and the fusion vector corresponding to the target node is denoted as: $e^* = e^{(0)} \| \ldots \| e^{(m)}$.

For the user node and the content node, $e_u^* = e_u^{(0)} \| \ldots \| e_u^{(m)}$, and $e_c^* = e_c^{(0)} \| e_c^{(m)}$. $e_u^*$ is the fusion vector corresponding to user node u, $e_u^m$ is the $m^{th}$-order stacking vector corresponding to user node u, $e_c^*$ is the fusion vector corresponding to content node c, and $e_c^m$ is the $m^{th}$-order stacking vector corresponding to content node c.

Step 203: Determine, for a target user node among the plurality of user nodes, interactive prediction values between the target user node and the plurality of content nodes based on a fusion vector corresponding to the target user node and fusion vectors corresponding to the plurality of content nodes, the interactive prediction values being used for representing interaction possibilities between the target user node and the content nodes.

The target user node may refer to any one of the user nodes. The target content node described below may refer to any one of the content nodes.

In one example, the process of obtaining, for the target content node among the plurality of content nodes, the interactive prediction value between the target user node and the target content node may be as follows: calculating an inner product between the fusion vector corresponding to the target user node and a fusion vector corresponding to the target content node; and determining an interactive prediction value between the target user node and the target content node according to the inner product.

In some embodiments, the inner product may be directly taken as the interactive prediction value between the target user node and the target content node, and the interactive prediction value between the target user node and the target content node may also be calculated based on the inner product. This embodiment of this application is not limited thereto. The inner product may be positively correlated with the interactive prediction value. As the inner product is greater, the interactive prediction value is greater, that is, the interaction possibility between the target user node and the target content node is greater (the correlation between the target user node and the target content node is higher).

For user node u and content node c, the interactive prediction value between user node u and content node c may be denoted as: $\hat{y}_{uc} = e_u^{*T} e_c^*$.

In some possible designs, the foregoing word embedding vectors, aggregation vectors, stacking vectors, and fusion vectors may all be obtained through a neural network model (for example, an interactive prediction model as described below). Exemplarily, the interactive prediction value between the user node and the content node may be obtained through the interactive prediction model based on the input structure graph by obtaining the word embedding vectors, the aggregation vectors, the stacking vectors, and the fusion vectors corresponding to each user node and each content node in the input structure graph, so as to select the content node. The interactive prediction model will be described in detail below and will not be described in detail herein.

Step 204: Select a recommended content node from the plurality of content nodes according to the interactive prediction values between the target user node and the plurality of content nodes and a diversity index of a recommended content node set, content corresponding to the recommended content node being a recommended content to be provided for a target user corresponding to the target user node, and the recommended content node set including the recommended content node.

The diversity index is used for representing the diversity of a node set. For example, the diversity index of the recommended content node set is used for representing the diversity of the recommended content node set. In some embodiments, the diversity index of the recommended content node set may be obtained according to a determinant of a positive semi-definite matrix formed based on the recommended content node set.

In one example, the process of obtaining the recommended content node may include at least one of the following steps (2041-2042):

Step 2041: Select, according to the interactive prediction values, a first quantity of candidate content nodes from the plurality of content nodes to obtain a candidate content node set corresponding to the target user node.

The first quantity is less than a total quantity of content nodes and greater than a required quantity of recommended content nodes (namely, a second quantity described below), which may be set according to actual usage requirements. In one example, assuming that the second quantity is a, the first quantity may be set to b*a, where b is a positive integer, and a is much smaller than the total quantity of content nodes.

In one example, the plurality of content nodes may be ranked first according to a descending order of the interactive prediction values to obtain a content node sequence. Then a first quantity of content nodes is selected from the content node sequence to obtain the candidate content node set. For example, the first b*a content nodes in the content node sequence are taken as candidate content nodes, so as to obtain the candidate content node set, and the candidate content node set of target user node u may be denoted as:

$$Z_u=\{c_1,c_2,\ldots,c_{ba}\}.$$

In some embodiments, content nodes in the content node sequence that interact with the target user node may also be removed before the candidate content nodes are selected from the content node sequence, and the first b*a content nodes are selected from the adjusted content node sequence.

Step 2042: Exclusively select, according to the diversity index of the recommended content node set, a second quantity of candidate content nodes from the candidate content node set as the recommended content node, the second quantity being less than the first quantity.

In some embodiments, an initial state of the recommended content node set is empty, the recommended content node set in a final state includes a second quantity of recommended content nodes, and the diversity index of the recommended content node set in the final state is lowest at the same order of magnitude.

In one example, the process of selecting the recommended content node may be as follows: taking, in response to a diversity index reduction degree of the recommended content node set added with a $j^{th}$ candidate content node in the candidate content node set being less than a diversity index reduction degree of the recommended content node set added with other candidate content nodes in the candidate content node set, the $j^{th}$ candidate content node as the recommended content node; adding the $j^{th}$ candidate content node into the recommended content node set, j being a positive integer; eliminating the $j^{th}$ candidate content node from the candidate content node set to obtain an adjusted candidate content node set; continuing to select the recommended content node from the adjusted candidate content node set when the quantity of recommended content nodes in the recommended content node set is less than the second quantity; and stopping selecting the recommended content node when the quantity of recommended content nodes in the recommended content node set is equal to the second quantity.

The diversity index reduction degree refers to, for an original recommended content node set, a reduction degree of the diversity index of the original recommended content node set added with a certain candidate content node from the diversity index of the original recommended content node set, which may be represented by a difference value therebetween.

Exemplarily, the selection of each recommended content node needs to satisfy the following formula:

$$s = \arg\max_{j\in Z_u\backslash S}(\text{logdet}(L_{S\cup\{j\}}) - \text{logdet}(L_S)),$$

where s is the recommended content node, S is the recommended content node set, j is $j^{th}$ candidate content node in a candidate content node set $Z_u$, $L_S$ is the positive semi-definite matrix composed of the recommended content node set S, and $\det(L_s)$ is a determinant (namely, diversity index) of the recommended content node set S, which is used for representing the diversity degree of the recommended content node set S. $L_{S\cup\{j\}}$ is the positive semi-definite matrix composed of the recommended content node set S added with the $j^{th}$ candidate content node, and $\det(L_{S\cup\{j\}})$ is the determinant (namely, diversity index) of the recommended content node set S added with the $j^{th}$ candidate content node, which is used for representing the diversity degree of the recommended content node set S added with the $j^{th}$ candidate content node.

In some embodiments, as $\det(L_s)$ is larger, the recommended content nodes in the recommended content node set S are more diverse, and the quantity of recommended content nodes in the recommended content node set S is larger. $\det(L_s)$ is smaller, and $\det(L_{S\cup\{j\}})$ is a non-increasing function relative to the quantity of recommended content nodes in the recommended content node set S.

By the above formula, in each selection process of the recommended content node, a new candidate content node which can reduce the diversity index of a new set composed of the new candidate content node and S to the minimum may be found from $Z_u$. The new candidate content node is the recommended content node in the selection process.

In some embodiments, the positive semi-definite matrix L may be calculated by the following formula:

$$L=I-(B_u^T B_u-I)^{-1},$$

where $I\in\mathbb{R}^{b^*a\times b^*a}$ is an identity matrix, which ensures $\det(L)\le 1$ whereby L conforms to the definition of a probability model, $B_u$ is a matrix composed of the recommended content node set (namely, the foregoing recommended content node set S) corresponding to target user node u, and $B_u^T$ is the transpose of $B_u$.

In some embodiments, through the foregoing method, a recommended content node set corresponding to each user node may be obtained firstly. For a target user node, the recommended content node set corresponding to the target user node may be determined therefrom, so as to determine a recommended content corresponding to a target user based on the recommended content node set corresponding to the target user node.

In summary, according to the technical solution provided by this embodiment of this application, a recommended content node is selected from a plurality of content nodes by combining interactive prediction values between user nodes and the content nodes and a diversity index of a set composed of recommended content nodes, and the correlation between the recommended content node and the user nodes and the diversity of the recommended content node are comprehensively considered, thereby improving the diversity of a recommended content while the recommended content is correlated with a user.

In addition, in this embodiment of this application, a first quantity of candidate content nodes with interactive prediction values is selected from a plurality of content nodes, and then a second quantity (less than the first quantity) of recommended content nodes is selected from the candidate content nodes, whereby the recommended content nodes have a higher correlation with a target user node without forcibly reducing the correlation between the recommended content nodes and the target user node, thereby ensuring the correlation between the recommended content and the user.

In addition, after the user browses a sufficient number of similar contents, aesthetic fatigue may occur. Thus, the user may stop browsing the similar contents, thereby generating a demand for other different types of contents. However, similar contents may still be recommended to the user in the related art, thus causing a fact that the recommendation is over-fitting. The user may also generate aesthetic fatigue, the browsing experience is affected, and the user is even dissuaded. With the technical solutions provided by this embodiment of this application, content diversity recommendation may be performed to a certain extent, whereby the aesthetic fatigue caused by the user browsing similar contents for a long time can be effectively alleviated, and the user experience can be improved, thereby achieving the effect of improving the user residence time.

Figure 5:
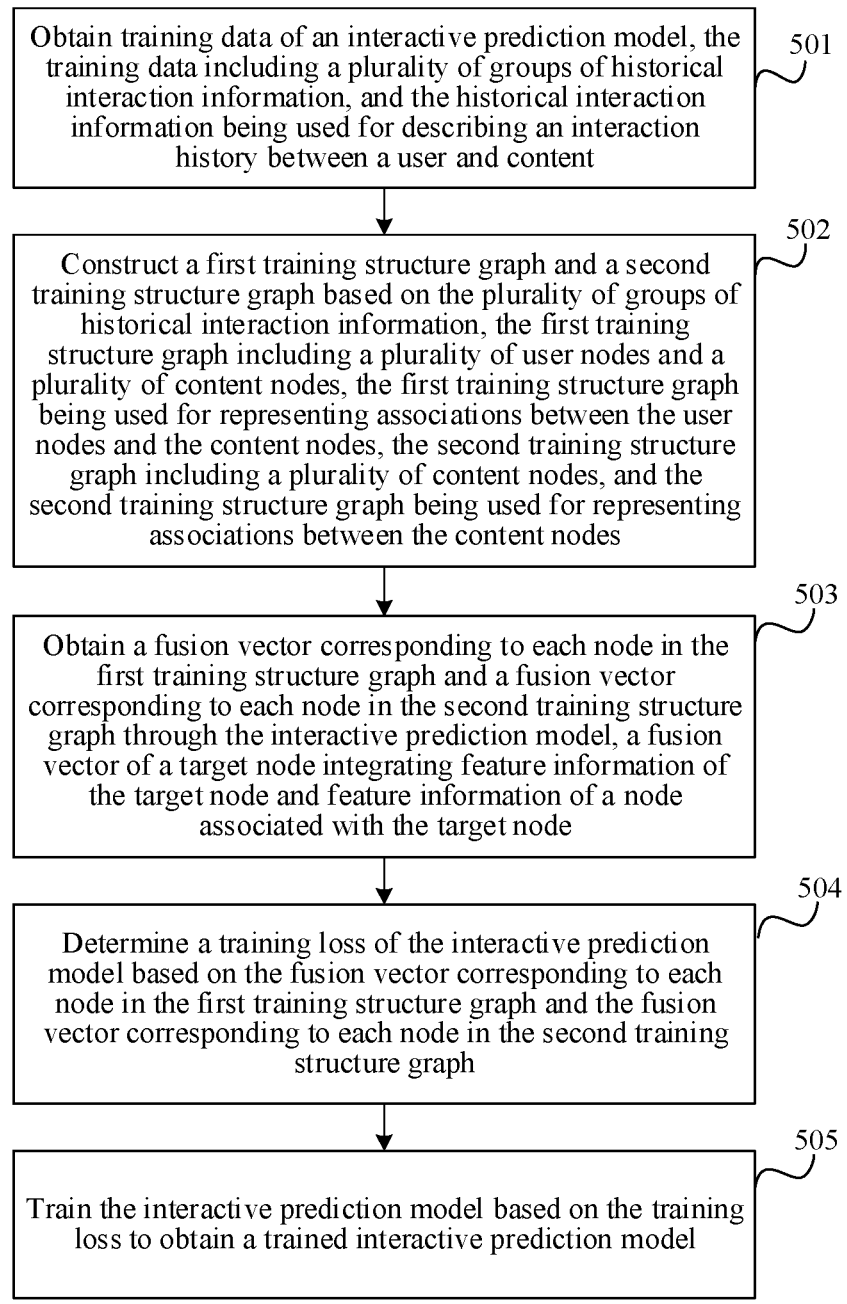
FIG. 5 is a flowchart of an interactive prediction model training method according to an embodiment of this application.
Figure 6:
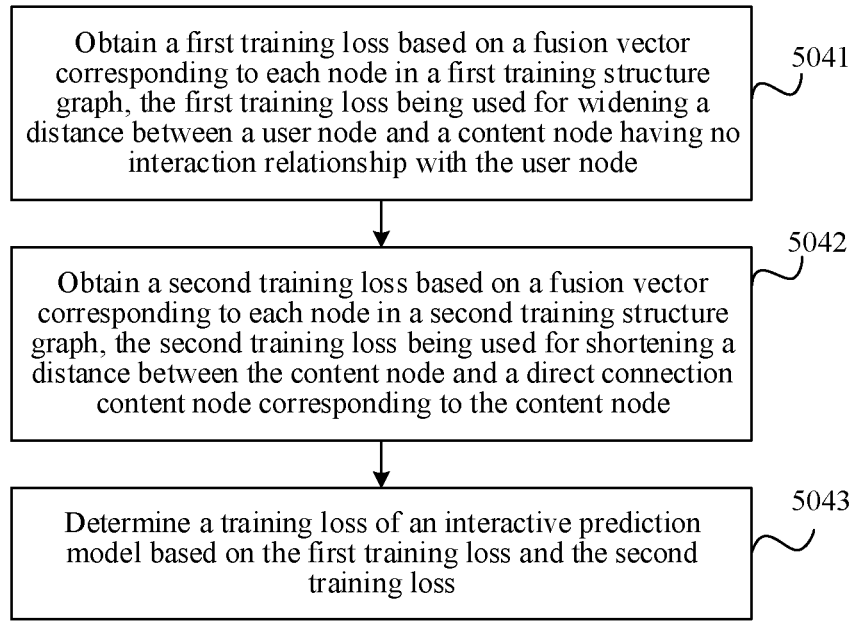
FIG. 6 is a flowchart of a method for obtaining a training loss of an interactive prediction model according to an embodiment of this application.

FIG. 5 shows a flowchart of an interactive prediction model training method according to an embodiment of this application. The execution entity for the steps of the method may be the terminal 10 or the server 20 in the scheme implementation environment shown in FIG. 1. The method may include the following steps (501-505):

Step 501: Obtain training data of an interactive prediction model, the training data including a plurality of groups of historical interaction information, and the historical interaction information being used for describing an interaction history between a user and content.

In this embodiment of this application, the interactive prediction model is a model for predicting the interaction possibility between the user and the content. In some embodiments, the interactive prediction model may refer to a graph neural network model, such as a graph convolution network model, a graph attention network model, or a graph self-encoder model. The user, the content, and the historical interaction information are the same as described in the foregoing embodiments, and will not be described again herein.

In some embodiments, for different applications, training data may be obtained from the different applications, and the interactive prediction model is trained with the training data, so as to obtain the interactive prediction model corresponding to the different applications.

Step 502: Construct a first training structure graph and a second training structure graph based on the plurality of groups of historical interaction information, the first training structure graph including a plurality of user nodes and a plurality of content nodes, the first training structure graph being used for representing associations between the user nodes and the content nodes, the second training structure graph including a plurality of content nodes, and the second training structure graph being used for representing associations between the content nodes.

In this embodiment of this application, the first training structure graph refers to a structure graph with a user node as one subset and a content node as another subset. The first training structure graph is the same as the input structure graph described in the foregoing embodiments, and will not be described again herein.

The second training structure graph may refer to a unary graph of content node elements, which may display potential associations between the content nodes. Each node in the second training structure graph is each content node in the first training structure graph. The content nodes are connected by connecting edges, and the quantity of connecting edges may be used for representing the correlation and similarity between the content nodes. In some embodiments, the second training structure graph may be constructed by determining the potential associations between the content nodes based on the first training structure graph, or the historical interaction information or interaction matrices between the user nodes and the content nodes.

Exemplarily, based on the foregoing example, if video node 1 and video node 2 in the first training node graph are connected to user node 1, video node 2 may be determined as a direct connection node (namely, first-order neighbor node) of video node 1. If video node 2 is connected to user node 3 and user node 3 is connected to video node 3, video node 3 may be determined as a second-order neighbor node of video node 1.

Step 503: Obtain a fusion vector corresponding to each node in the first training structure graph and a fusion vector corresponding to each node in the second training structure graph through the interactive prediction model, a fusion vector of a target node integrating feature information of the target node and feature information of a node associated with the target node.

The target node may be any one of the nodes in the first training structure graph or any one of the nodes in the second training structure graph.

In some embodiments, the interactive prediction model may be divided into four layers: a word embedding layer, a feature aggregation layer, a feature stacking layer, and a feature fusion layer. The word embedding vector corresponding to each node in the first training structure graph and the word embedding vector corresponding to each node in the second training structure graph are obtained through the embedding layer.

The aggregation vector corresponding to each node in the first training structure graph is obtained based on the word embedding vector corresponding to each node in the first training structure graph through the feature aggregation layer, and the aggregation vector corresponding to each node in the second training structure graph is obtained based on the word embedding vector corresponding to each node in the second training structure graph through the feature aggregation layer.

The stacking vector corresponding to each node in the first training structure graph is obtained based on the aggregation vector corresponding to each node in the first training structure graph through the feature stacking layer, and the stacking vector corresponding to each node in the second training structure graph is obtained based on the aggregation vector corresponding to each node in the second training structure graph through the feature stacking layer.

The fusion vector corresponding to each node in the first training structure graph is obtained by concatenating the word embedding vector, the aggregation vector, and the stacking vector corresponding to each node in the first training structure graph through the feature fusion layer. The stacking vector corresponding to each node in the second training structure graph is obtained by concatenating the word embedding vector, the aggregation vector, and the stacking vector corresponding to each node in the second training structure graph through the feature fusion layer.

Each node in the first training structure graph corresponds to the aggregation vector, the stacking vector, and the fusion vector, which are the same as those described in the foregoing embodiments, and will not be described in detail herein. The method for obtaining the aggregation vector, the stacking vector, and the fusion vector corresponding to each node in the second training structure graph is the same as the method for obtaining the aggregation vector, the stacking vector, and the fusion vector corresponding to each node in the first training structure graph, but the calculated network parameters are different, and the detailed description may be as follows:

The word embedding vector corresponding to each node in the second training structure graph is the same as the word embedding vector corresponding to each content node in the first training structure graph on a one-to-one basis. That is, it may be denoted as $e_{c_1}, e_{c_2}, \ldots, e_{c_m}$, where $e_{c_m}$ is the word embedding vector corresponding to an $m^{th}$ node in the second training structure graph.

Since the structure of the second training structure graph is different from that of the first training structure graph, the aggregation vector corresponding to each node in the second training structure graph is different from the aggregation vector corresponding to each content node in the first training structure graph, the stacking vector corresponding to each node in the second training structure graph is different from the stacking vector corresponding to each content node in the first training structure graph, and the fusion vector corresponding to each node in the second training structure graph is different from the fusion vector corresponding to each content node in the first training structure graph.

In some embodiments, the representation of the aggregation vector corresponding to each node in the second training structure graph is denoted as:

$$e^{C^1} = \text{LeakyReLU}(W_1^C e_x + \sum_{y \in N_x} \frac{1}{\sqrt{|N_K||N_y|}}(W_1^C e_y + W_2^C(e_y \odot e_x))),$$

where $e^{C'}$ is the aggregation vector corresponding to the node in the second training structure graph, LeakyReLU is the activation function, $W_1^C$ and $W_2^C$ are trainable weight parameters of the corresponding aggregation vectors in the second training structure graph, $W_1^C$ and $W_2^C$ are matrices of d'×d, d is the same as d in the foregoing embodiments, $e_x$ is the word embedding vector corresponding to node x in the second training structure graph, $N_x$ is a direct connection node set of node x, $e_y$ is the word embedding vector corresponding to a $y^{th}$ direct connection node in the direct connection node set of node x, and $N_y$ is the direct connection node set including the yth direct connection node of node x. $e_y \odot e_x$ represents pair-wise element multiplication of $e_y$ and $e_x$, which may be used for representing the similarity between node x and direct connection node y. That is, the formula can aggregate more information similar to and relevant to node x into the fusion vector of node x. In some embodiments, the aggregation vector corresponding to the node in the second training structure graph may be understood as the first-order stacking vector corresponding to the node in the second training structure graph.

In some embodiments, the matrix form of the stacking vector corresponding to each node in the second training structure graph is expressed as:

$$E^{C(p)} = \text{LeakyReLU}((\mathcal{L}^C + I)E^{C(p-1)}W_1^{C(p)} + \mathcal{L}^C E^{C(p-1)} \odot E^{C(p-1)}W_2^{C(p)}),$$

where $E^{C(p)}$ is the matrix form of a $p^{th}$ (p is greater than 1) stacking vector corresponding to the node in the second training structure graph, which may be denoted as $E^{C(p)} \in \mathbb{R}^{|C|*d_p}$, C is the content node set, and $d_p$ is the length of stacking. $\mathcal{L}^C$ is the Laplacian matrix corresponding to the second training structure graph, $$\mathcal{L}^C = D^{C-\frac{1}{2}} A^C D^{C-\frac{1}{2}}, A^C = R^C, D^C$$

is the diagonal matrix corresponding to the second training structure graph, and diagonal elements of $D^C$ are $A^C$. $R^C \in \mathbb{R}^{|C| \times |C|}$, and $R^C$ is the interaction matrix between the content nodes. I is the identity matrix, $E^{C(p-1)}$ is the matrix form of a $(p-1)^{th}$-order stacking vector corresponding to the node in the second training structure graph, and $W_1^{C(p)}$ and $W_2^{C(p)}$ are trainable weight parameters corresponding to the $p^{th}$-order stacking vector corresponding to the node in the second training structure graph.

In some embodiments, the matrix representation of m-order stacking vectors corresponding to the nodes in the second training structure graph may be denoted as: $E^{C(1)}, E^{C(2)}, \ldots, E^{C(m)}, E^{C(1)}$, where may be understood as the matrix representation of the aggregation vector corresponding to the node in the second training structure graph. Then the m-order stacking vectors corresponding to the node in the second training structure graph are: $e^{C(1)}, e^{C(2)}, \ldots, e^{C(m)}$. By concatenating $e^{C(0)}, e^{C(1)}, e^{C(2)}, \ldots, e^{C(m)}$, the fusion vector corresponding to the node in the second training structure graph may be obtained. $e^{C(0)}$ may be understood as the word embedding vector corresponding to the node in the second training structure graph, $e^{C(1)}$ may be understood as the aggregation vector corresponding to the node in the second training structure graph, and the fusion vector corresponding to the node in the second training structure graph is denoted as:

$$e^{C*} = e^{C(0)} \| \ldots \| e^{C(m)}.$$

Step 504: Determine a training loss of the interactive prediction model based on the fusion vector corresponding to each node in the first training structure graph and the fusion vector corresponding to each node in the second training structure graph.

In some embodiments, the process of obtaining the training loss of the interactive prediction model may include at least one of the following steps (5041-5043):

Step 5041: Obtain a first training loss based on the fusion vector corresponding to each node in the first training structure graph, the first training loss being used for widening a distance between the user node and a content node having no interaction relationship with the user node.

In some embodiments, the process of obtaining the first training loss may be as follows:

1: Determine a first interaction set and a second interaction set corresponding to a first user node in the first training structure graph, a content node having an interaction relationship with the first user node in each group of user content pairs in the first interaction set, and a content node having no interaction relationship with the first user node in each group of user content pairs in the second interaction set.

In some embodiments, the user content pair refers to a set of one user node and one content node. For example, the user content pair of the first user node may refer to a set of the first user node and any one of the content nodes.

Exemplarily, based on the foregoing example, for user node 1, a user content pair composed of user node 1 and video node 1 and a user content pair composed of user node 1 and video node 2 may be added to the first interaction set. A user content pair composed of user node 1 and video node 3 is added to the second interaction set.

2: Determine an interactive prediction value corresponding to each group of user content pairs in the first interaction set and an interactive prediction value corresponding to each group of user content pairs in the second interaction set based on the fusion vector corresponding to each node in the first training structure graph.

For a target user content pair, an interactive prediction value corresponding to the target user content pair is determined based on an inner product between a fusion vector corresponding to a first user node in the target user content pair and a fusion vector corresponding to a content node. The target user content pair may be any user content pair in the first interaction set, and may also be any user content pair in the second interaction set.

3: Determine, for a target user content pair in the first interaction set, an intermediate loss corresponding to the target user content pair based on an interactive prediction value corresponding to the target user content pair and the interactive prediction value corresponding to each group of user content pairs in the second interaction set, the intermediate loss corresponding to the target user content pair being used for representing a total difference degree between the target user content pair and each group of user content pairs in the second interaction set.

In some embodiments, the process of obtaining the intermediate loss may be as follows: determining a sub-intermediate loss between the target user content pair and each group of user content pairs in the second interaction set based on a difference value between the interactive prediction value corresponding to the target user content pair and the interactive prediction value corresponding to each group of user content pairs in the second interaction set; and summing the sub-intermediate losses between the target user content pair and all the groups of user content pairs in the second interaction set to obtain the intermediate loss corresponding to the target user content pair.

The sub-intermediate loss between the target user content pair and the user content pair in the second interaction set may be determined based on the difference value between the interactive prediction value corresponding to the target user content pair and the interactive prediction value corresponding to the user content pair in the second interaction set.

4. Obtain a first sub-training loss corresponding to the first user node based on a sum value of intermediate loss values corresponding to all the groups of user content pairs in the first interaction set.

5: Sum first sub-training losses corresponding to the plurality of user nodes in the first training structure graph to obtain the first training loss.

Exemplarily, the first training loss may be expressed as follows:

$$\sum_{(u,c_i,c_j) \in O} -\ln\sigma\left(\hat{y}_{uc_i} - \hat{y}_{uc_j}\right),$$

where $O=\{(u, c_i, c_j) | (u, c_i) \in R^+, (u, c_j) \in R^-\}$, $R^+$ is a set (namely, first interaction set) of interaction between user node u and content node $c_i$, $R^-$ is a set (namely, second interaction set) of no interaction between user node u and content node $c_j$, the total quantity of $c_i$ and $c_j$ is the total quantity of the content nodes in the first training structure graph, $\sigma(\cdot)$ is the activation function, such as a Sigmoid function, $\hat{y}_{uc_i}$ is the interactive prediction value between user node u and content node $c_i$, and $\hat{y}_{uc_j}$ is the interactive prediction value between user node u and content node $c_j$.

5042: Obtain a second training loss based on the fusion vector corresponding to each node in the second training structure graph, the second training loss being used for shortening a distance between the content node and a direct connection content node corresponding to the content node.

In some embodiments, the process of obtaining the second training loss may be as follows: determining, for a first content node in the second training structure graph, a direct connection content node set of the first content node; determining, for a target direct connection content node in the direct connection content node set, a fourth intermediate vector corresponding to the target direct connection content node based on a difference between a fusion vector corresponding to the first content node and a fusion vector corresponding to the target direct connection content node; summing fourth intermediate vectors corresponding to all direct connection content nodes in the direct connection content node set to obtain a second sub-training loss corresponding to the first content node; and summing second sub-training losses corresponding to all content nodes in the second training structure graph to obtain the second training loss.

Exemplarily, the second training loss may be expressed as follows:

$$\sum_{t=1}^{|C|} \sum_{v \in N_t} \left\| e_t^{C^*} - e_v^{C^*} \right\|_2,$$

where C is the content node set (namely, including all the nodes in the second training structure graph) in the second training structure graph, $N_t$ is the direct connection node set including content node t in the second training structure graph, $e_t^{C^*}$ is the fusion vector of content node t in the second training structure graph, $e_v^{C^*}$ is the fusion vector of content node v in the direct connection node set including content node t in the second training structure graph, and $\|\cdot\|_2$ is a 2-norm of the vector.

5043: Determine the training loss of the interactive prediction model based on the first training loss and the second training loss.

In some embodiments, the first training loss and the second training loss may be summed to obtain the training loss of the interactive prediction model. The training loss of the interactive prediction model may be expressed as follows:

$$\text{LOSS} = \sum_{(u,c_i,c_j) \in O} -\ln\sigma\left(\hat{y}_{uc_i} - \hat{y}_{uc_j}\right) + \sum_{t=1}^{|C|} \sum_{v \in N_t} \left\| e_t^{C^*} - e_v^{C^*} \right\|_2.$$

Step 505: Train the interactive prediction model based on the training loss to obtain a trained interactive prediction model.

In some embodiments, model parameters of the interactive prediction model are optimized by back-propagation of the training loss of the interactive prediction model using an optimizer to obtain trained model parameters: word embedding layer parameters, feature aggregation layer parameters (such as $W_1$, $W_2$, $W_1^C$, and $W_2^C$), feature stacking layer parameters (such as $W_1^{(p)}$, $W_2^{(p)}$, $W_1^{C(p)}$, and $W_2^{C(p)}$), and the like, where p=1, 2, . . . , m. The model parameters of the interactive prediction model are adjusted based on the trained model parameters to obtain the trained interactive prediction model.

The interactive prediction value between the user node and the content node is obtained by obtaining the word embedding vectors, the aggregation vectors, the stacking vectors, and the fusion vectors corresponding to the user node and the content node through the trained interactive prediction model, so as to select the content node.

In summary, according to the technical solution provided by the embodiments of this application, an interactive prediction model is trained by explicitly considering potential associations between content nodes on the basis of explicitly considering potential associations between the content nodes and user nodes in the process of training the interactive prediction model, whereby the interactive prediction model may more accurately capture the correlation between the user nodes and the content nodes, thereby improving the prediction accuracy of the interactive prediction model.

In addition, it is to be understood that data relevant to user information is involved in the specific implementations of this application. When the above embodiments of this application are applied to a particular product or technology, user approval or consent is required, and collection, use and processing of the relevant data is required to comply with relevant national and regional laws and regulations and standards. For example, the contents in this application relating to user identification information, user attribute information, and historical interaction information between a user and a video are all collected when being allowed by the user and complying with relevant laws and regulations and standards.

The following describes apparatus embodiments of this application, which may be used for executing the method embodiments of this application. Details not disclosed in the apparatus embodiments of this application may be similar to those in the method embodiments of this application.

Figure 7:
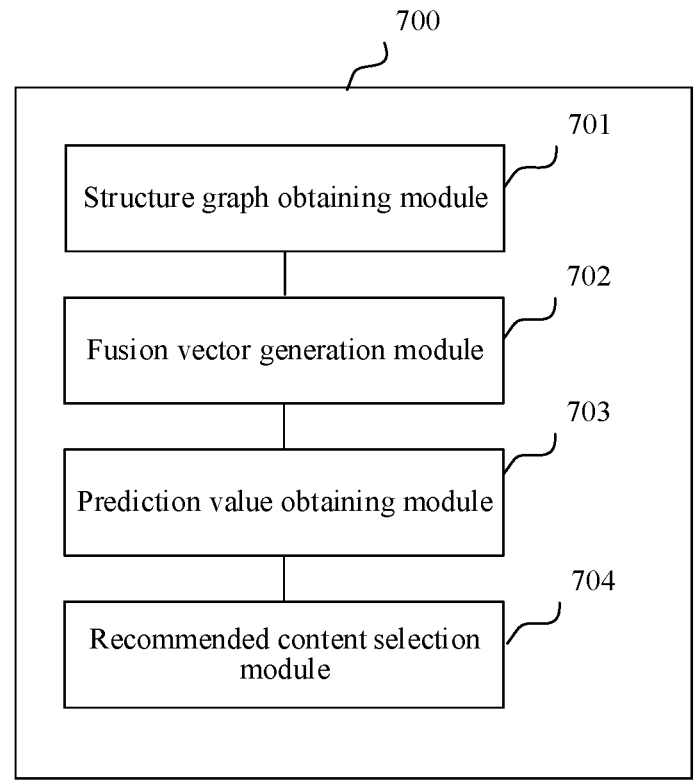
FIG. 7 is a block diagram of a recommended content selection apparatus according to an embodiment of this application.

FIG. 7 shows a block diagram of a recommended content selection apparatus according to an embodiment of this application. The apparatus has a function of implementing the foregoing method examples. The function may be implemented by hardware or may be implemented by hardware executing corresponding software. The apparatus may be a computer device as described above or may be disposed in the computer device. As shown in FIG. 7, the apparatus 700 includes: a structure graph obtaining module 701, a fusion vector generation module 702, a prediction value obtaining module 703, and a recommended content selection module 704.

The structure graph obtaining module 701 is configured to obtain an input structure graph. The input structure graph includes a plurality of user nodes and a plurality of content nodes. The input structure graph is used for representing associations between the user nodes and the content nodes. The input structure graph is constructed based on historical interaction information between the user nodes and the content nodes.

The fusion vector generation module 702 is configured to generate, according to the input structure graph, fusion vectors corresponding to nodes in the input structure graph using an interactive prediction model. A fusion vector corresponding to a target node among the nodes integrates feature information of the target node and feature information of a node associated with the target node. The node associated with the target node refers to a node directly or indirectly connected to the target node through a connecting edge in the input structure graph.

The prediction value obtaining module 703 is configured to determine, for a target user node among the plurality of user nodes, interactive prediction values between the target user node and the plurality of content nodes based on a fusion vector corresponding to the target user node and fusion vectors corresponding to the plurality of content nodes. The interactive prediction values are used for representing interaction possibilities between the target user node and the content nodes.

The recommended content selection module 704 is configured to select a recommended content node from the plurality of content nodes according to the interactive prediction values between the target user node and the plurality of content nodes and a diversity index of a recommended content node set. The diversity index of the recommended content node set is used for representing diversity of the recommended content node set. A content corresponding to the recommended content node is a recommended content to be provided for a target user corresponding to the target user node. The recommended content node set includes the recommended content node.

Figure 8:
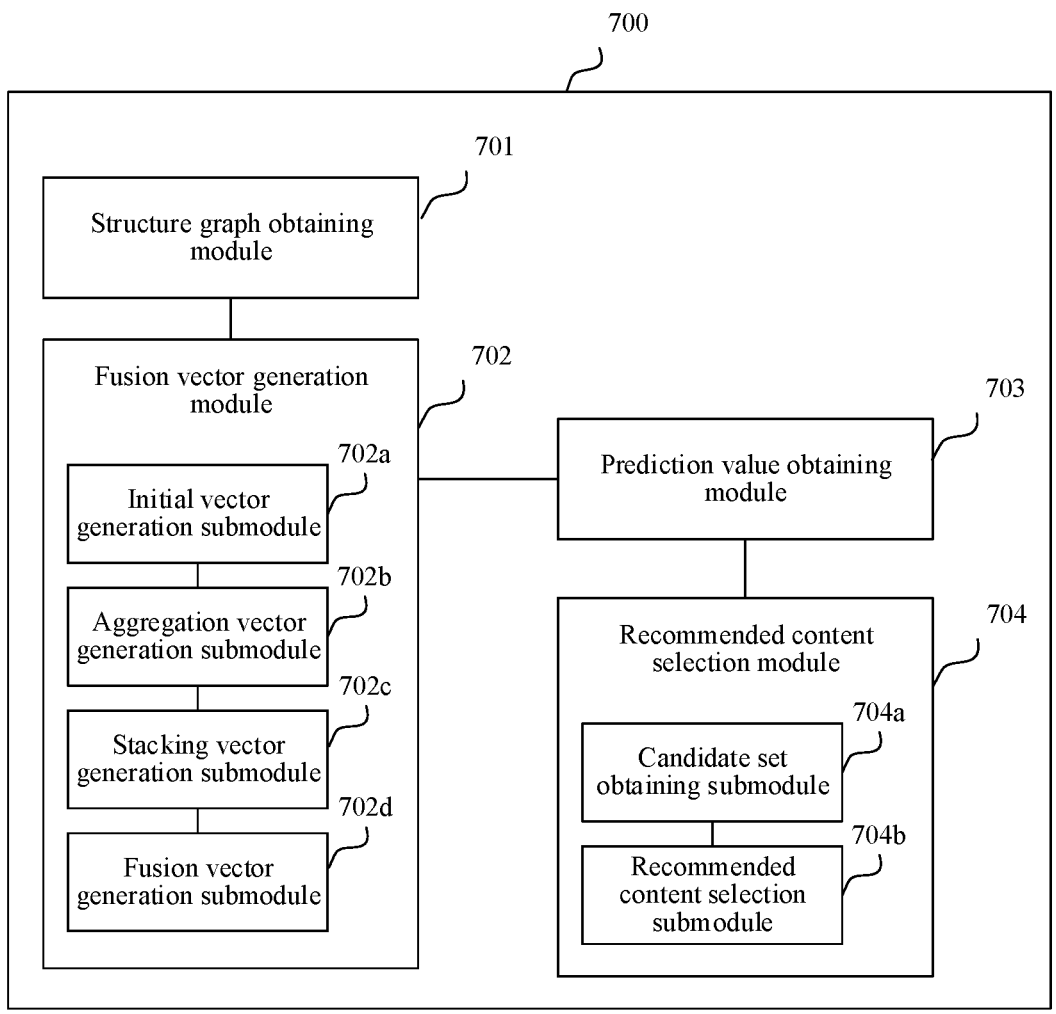
FIG. 8 is a block diagram of a recommended content selection apparatus according to another embodiment of this application.

In an exemplary embodiment, as shown in FIG. 8, the recommended content selection module 704 includes: a candidate set obtaining submodule 704a and a recommended content selection submodule 704b.

The candidate set obtaining submodule 704a is configured to select, according to the interactive prediction values, a first quantity of candidate content nodes from the plurality of content nodes to obtain a candidate content node set corresponding to the target user node.

The recommended content selection submodule 704b is configured to exclusively select, according to the diversity index of the recommended content node set, a second quantity of candidate content nodes from the candidate content node set as the recommended content node. The second quantity is less than the first quantity.

In an exemplary embodiment, the recommended content selection submodule 704b is configured to:

take, in response to a diversity index reduction degree of the recommended content node set added with a $j^{th}$ candidate content node in the candidate content node set being less than a diversity index reduction degree of the recommended content node set added with other candidate content nodes in the candidate content node set, the $j^{th}$ candidate content node as the recommended content node, j being a positive integer;

add the $j^{th}$ candidate content node into the recommended content node set;

eliminate the $j^{th}$ candidate content node from the candidate content node set to obtain an adjusted candidate content node set;

continue to select the recommended content node from the adjusted candidate content node set when the quantity of recommended content nodes in the recommended content node set is less than the second quantity; and stop selecting the recommended content node when the quantity of recommended content nodes in the recommended content node set is equal to the second quantity.

In an exemplary embodiment, the candidate set obtaining submodule 704a is configured to:

rank the plurality of content nodes according to a descending order of the interactive prediction values to obtain a content node sequence; and select a first quantity of content nodes from the content node sequence to obtain the candidate content node set.

In an exemplary embodiment, as shown in FIG. 8, the fusion vector generation module 702 includes: an initial vector generation submodule 702a, an aggregation vector generation submodule 702b, a stacking vector generation submodule 702c, and a fusion vector generation submodule 702d.

The initial vector generation submodule 702a is configured to obtain word embedding vectors corresponding to the nodes in the input structure graph using the interactive prediction model.

The aggregation vector generation submodule 702b is configured to perform, according to the input structure graph, feature aggregation on a word embedding vector corresponding to the target node among the nodes using the interactive prediction model to obtain an aggregation vector corresponding to the target node. The aggregation vector corresponding to the target node is used for aggregating the feature information of the target node and the feature information of a direct connection node of the target node.

The stacking vector generation submodule 702c is configured to perform, according to the input structure graph, feature stacking on the aggregation vector corresponding to the target node using the interactive prediction model to obtain a stacking vector corresponding to the target node. The stacking vector corresponding to the target node is used for stacking the feature information of the target node and the feature information of the node associated with the target node.

The fusion vector generation submodule 702d is configured to generate, according to the word embedding vector, the aggregation vector and the stacking vector corresponding to the target node, a fusion vector corresponding to the target node using the interactive prediction model.

In an exemplary embodiment, the aggregation vector generation submodule 702b is configured to:
  determine, according to the input structure graph, a direct connection node set corresponding to the target node using the interactive prediction model;
  perform, for a target direct connection node in the direct connection node set, element multiplication on the word embedding vector corresponding to the target node and a word embedding vector corresponding to the direct connection node using the interactive prediction model to obtain a first intermediate vector;
  perform, using the interactive prediction model, weighted summation on the first intermediate vector and the word embedding vector corresponding to the direct connection node to obtain a second intermediate vector corresponding to the target direct connection node;
  sum the second intermediate vectors corresponding to the direct connection nodes in the direct connection node set to obtain a third intermediate vector; and
  perform feature aggregation on the word embedding vector corresponding to the target node and the third intermediate vector using the interactive prediction model to obtain the aggregation vector corresponding to the target node.

In an exemplary embodiment, the stacking vector includes m-order stacking vectors, m being a positive integer greater than 1. The fusion vector generation submodule 702d is configured to:
  determine, according to the input structure graph, a direct connection node set corresponding to the target node using the interactive prediction model;
  use the interactive prediction model for a $p^{th}$-order stacking vector among the m-order stacking vectors, and determine the aggregation vector corresponding to the target node as a first-order stacking vector corresponding to the target node when p is equal to 1;
  perform, when p is equal to 2, feature stacking on the aggregation vector corresponding to the target node and aggregation vectors corresponding to the direct connection nodes in the direct connection node set to obtain a second-order stacking vector corresponding to the target node using the interactive prediction model, p being a positive integer less than or equal to m; and
  perform, when p is greater than 2, feature stacking on a $(p-1)^{th}$-order stacking vector corresponding to the target node and $(p-1)^{th}$-order stacking vectors corresponding to the direct connection nodes to obtain the $p^{th}$-order stacking vector corresponding to the target node using the interactive prediction model.

In an exemplary embodiment, the prediction value obtaining module 703 is configured to:
  calculate an inner product between the fusion vector corresponding to the target user node and a fusion vector corresponding to the target content node; and
  determine an interactive prediction value between the target user node and the target content node according to the inner product.

In summary, according to the technical solution provided by this embodiment of this application, a recommended content node is selected from a plurality of content nodes by combining interactive prediction values between user nodes and the content nodes and a diversity index of a set composed of recommended content nodes, and the correlation between the recommended content node and the user nodes and the diversity of the recommended content node are comprehensively considered, thereby improving the diversity of a recommended content while the recommended content is correlated with a user.

Figure 9:
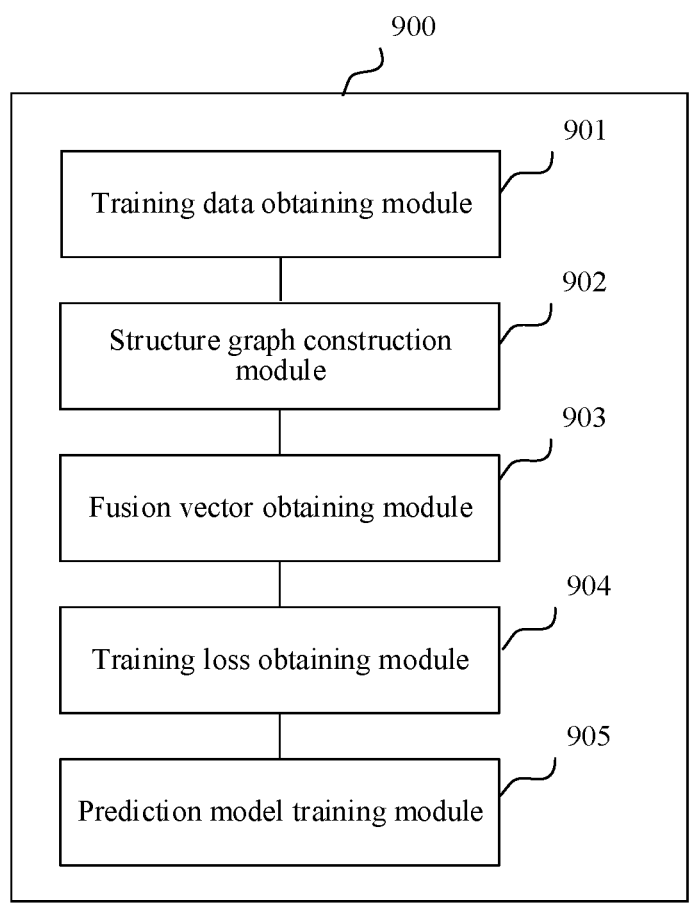
FIG. 9 is a block diagram of an interactive prediction model training apparatus according to an embodiment of this application.

FIG. 9 shows a block diagram of an interactive prediction model training apparatus according to an embodiment of this application. The apparatus has a function of implementing the foregoing method examples. The function may be implemented by hardware or may be implemented by hardware executing corresponding software. The apparatus may be a computer device as described above or may be disposed in the computer device. As shown in FIG. 9, the apparatus 900 includes: a training data obtaining module 901, a structure graph construction module 902, a fusion vector obtaining module 903, a training loss obtaining module 904, and a prediction model training module 905.

The training data obtaining module 901 is configured to obtain training data of an interactive prediction model. The training data includes a plurality of groups of historical interaction information, and the historical interaction information is used for describing an interaction history between a user and content.

The structure graph construction module 902 is configured to construct a first training structure graph and a second training structure graph based on the plurality of groups of historical interaction information. The first training structure graph includes a plurality of user nodes and a plurality of content nodes. The first training structure graph is used for representing associations between the user nodes and the content nodes. The second training structure graph includes a plurality of content nodes. The second training structure graph is used for representing associations between the content nodes.

The fusion vector obtaining module 903 is configured to obtain a fusion vector corresponding to each node in the first training structure graph and a fusion vector corresponding to each node in the second training structure graph through the interactive prediction model. A fusion vector of a target node integrates feature information of the target node and feature information of a node associated with the target node.

The training loss obtaining module 904 is configured to determine a training loss of the interactive prediction model based on the fusion vector corresponding to each node in the first training structure graph and the fusion vector corresponding to each node in the second training structure graph.

The prediction model training module 905 is configured to train the interactive prediction model based on the training loss to obtain a trained interactive prediction model.

Figure 10:
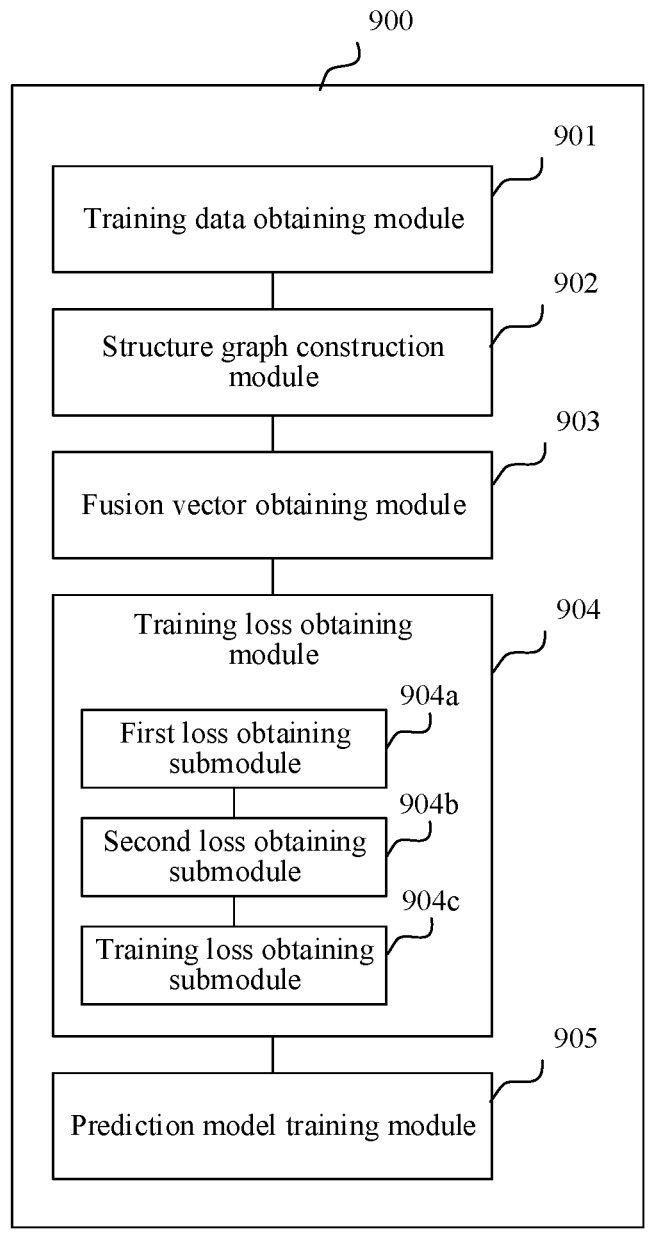
FIG. 10 is a block diagram of an interactive prediction model training apparatus according to another embodiment of this application.

In an exemplary embodiment, as shown in FIG. 10, the training loss obtaining module 904 includes: a first loss obtaining submodule 904a, a second loss obtaining submodule 904b, and a training loss obtaining submodule 904c.

The first loss obtaining submodule 904a is configured to obtain a first training loss based on the fusion vector corresponding to each node in the first training structure graph. The first training loss is used for widening a distance between the user node and a content node having no interaction relationship with the user node.

The second loss obtaining submodule 904b is configured to obtain a second training loss based on the fusion vector corresponding to each node in the second training structure graph. The second training loss is used for shortening a distance between the content node and a direct connection content node corresponding to the content node.

The training loss obtaining submodule 904c is configured to determine the training loss of the interactive prediction model based on the first training loss and the second training loss.

In an exemplary embodiment, the first loss obtaining submodule 904a is configured to:
  determine a first interaction set and a second interaction set corresponding to a first user node in the first training structure graph, a content node having an interaction relationship with the first user node in each group of user content pairs in the first interaction set, and a content node having no interaction relationship with the first user node in each group of user content pairs in the second interaction set;
  determine an interactive prediction value corresponding to each group of user content pairs in the first interaction set and an interactive prediction value corresponding to each group of user content pairs in the second interaction set based on the fusion vector corresponding to each node in the first training structure graph;
  determine, for a target user content pair in the first interaction set, an intermediate loss corresponding to the target user content pair based on an interactive prediction value corresponding to the target user content pair and the interactive prediction value corresponding to each group of user content pairs in the second interaction set, the intermediate loss corresponding to the target user content pair being used for representing a total difference degree between the target user content pair and each group of user content pairs in the second interaction set;
  obtain a first sub-training loss corresponding to the first user node based on a sum value of intermediate loss values corresponding to all the groups of user content pairs in the first interaction set; and
  sum first sub-training losses corresponding to the plurality of user nodes in the first training structure graph to obtain the first training loss.

In an exemplary embodiment, the first loss obtaining submodule 904a is further configured to:
  determine a sub-intermediate loss between the target user content pair and each group of user content pairs in the second interaction set based on a difference value between the interactive prediction value corresponding to the target user content pair and the interactive prediction value corresponding to each group of user content pairs in the second interaction set; and
  sum the sub-intermediate losses between the target user content pair and all the groups of user content pairs in the second interaction set to obtain the intermediate loss corresponding to the target user content pair.

In an exemplary embodiment, the second loss obtaining submodule 904b is configured to:
  determine, for a first content node in the second training structure graph, a direct connection content node set of the first content node;
  determine, for a target direct connection content node in the direct connection content node set, a fourth intermediate vector corresponding to the target direct connection content node based on a difference between a fusion vector corresponding to the first content node and a fusion vector corresponding to the target direct connection content node;
  sum fourth intermediate vectors corresponding to all direct connection content nodes in the direct connection content node set to obtain a second sub-training loss corresponding to the first content node; and
  sum second sub-training losses corresponding to all content nodes in the second training structure graph to obtain the second training loss.

In summary, according to the technical solution provided by the embodiments of this application, an interactive prediction model is trained by explicitly considering potential associations between content nodes on the basis of explicitly considering potential associations between the content nodes and user nodes in the process of training the interactive prediction model, whereby the interactive prediction model may more accurately capture the correlation between the user nodes and the content nodes, thereby improving the prediction accuracy of the interactive prediction model.

The apparatus provided in the foregoing embodiments is illustrated with an example of division of the foregoing function modules during the implementation of the functions thereof. In practical application, the foregoing functions may be allocated to and completed by different function modules according to requirements. That is, the internal structure of the device is divided into different function modules, so as to complete all or part of the functions described above. In addition, the apparatus provided in the foregoing embodiments and the method embodiments fall within the same conception. A specific implementation process is described in detail with reference to the method embodiments and will not be repeated herein.

Figure 11:
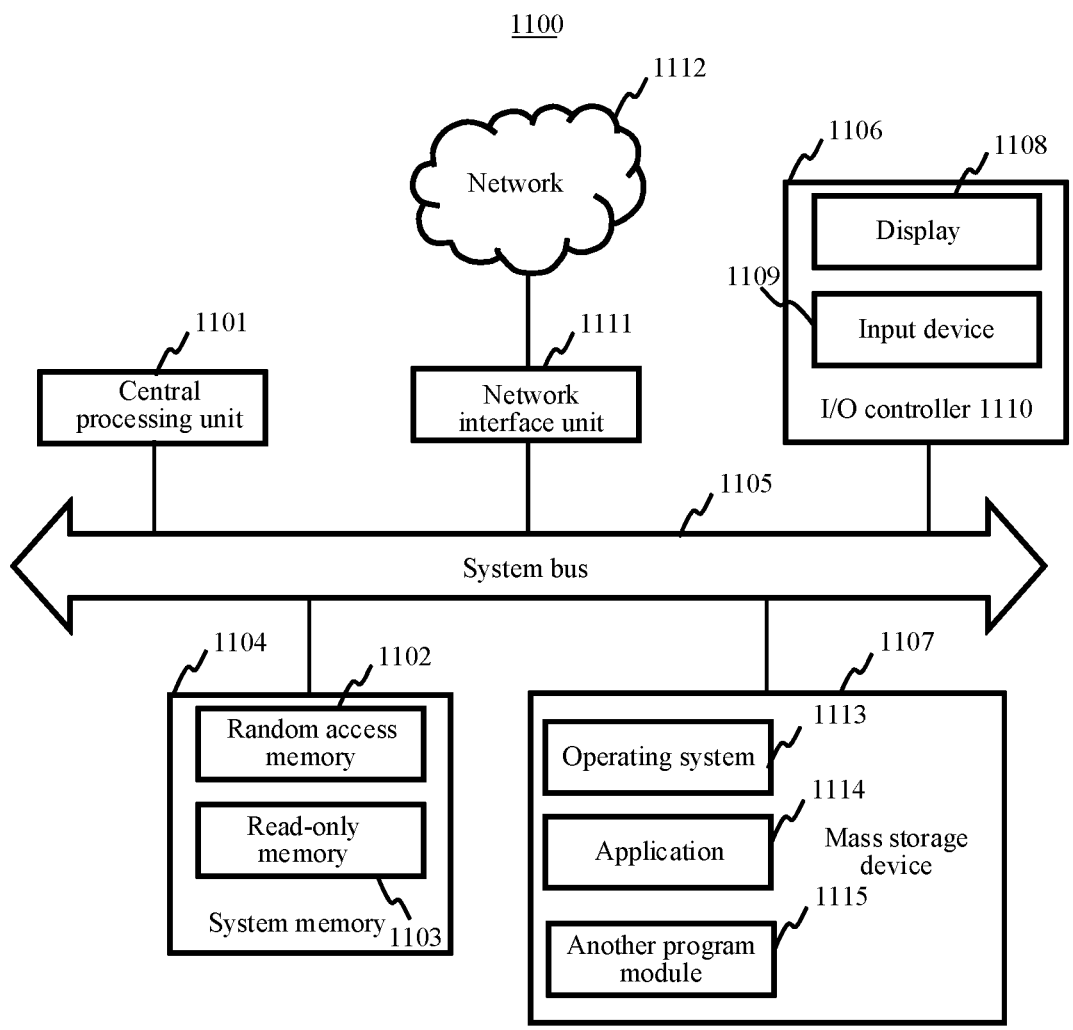
FIG. 11 is a block diagram of a computer device according to an embodiment of this application.

FIG. 11 shows a structural block diagram of a computer device according to an embodiment of this application. The computer device may be configured to implement the recommended content selection method or the interactive prediction model training method provided in the foregoing embodiments. The following content may be specifically included.

The computer device 1100 includes a central processing unit (for example, a central processing unit (CPU), a graphics processing unit (GPU), and a field programmable gate array (FPGA)) 1101, a system memory 1104 including a random-access memory (RAM) 1102 and a read-only memory (ROM) 1103, and a system bus 1105 connecting the system memory 1104 and the central processing unit 1101. The computer device 1100 further includes a basic input/output (I/O) system 1106 that facilitates transfer of information between components within a server, and a mass storage device 1107 that stores an operating system 1113, an application 1114, and another program module 1115.

The basic I/O system 1106 includes a display 1108 configured to display information and an input device 1109, such as a mouse or a keyboard, configured to input information for a user. The display 1108 and the input device 1109 are connected to the central processing unit 1101 through an I/O controller 1110 which is connected to the system bus 1105. The basic I/O system 1106 may further include the I/O controller 1110 for receiving and processing input from a plurality of other devices, such as a keyboard, a mouse, or an electronic stylus. Similarly, the I/O controller 1110 also provides output to a display screen, a printer, or another type of output device.

The mass storage device 1107 is connected to the central processing unit 1101 through a mass storage controller (not shown) connected to the system bus 1105. The mass storage device 1107 and a computer-readable medium associated therewith provide non-volatile storage for the computer device 1100. That is, the mass storage device 1107 may include a computer-readable medium (not shown) such as a hard disk or a compact disc read-only memory (CD-ROM) drive.

In general, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable read-only memory (EPROM), an electrically erasable programmable read-only memory (EEPROM), a flash memory or another solid-state memory technology, a CD-ROM, a digital video disc (DVD) or another optical memory, a tape cartridge, a magnetic tape, a magnetic disk memory, or another magnetic storage device. Certainly, a person skilled in the art may learn that the computer storage medium is not limited to the foregoing several types. The foregoing system memory 1104 and mass storage device 1107 may be collectively referred to as a memory.

According to this embodiment of this application, the computer device 1100 may further be connected, through a network such as the Internet, to a remote computer on the network and run. That is, the computer device 1100 may be connected to a network 1112 through a network interface unit 1111 which is connected to the system bus 1105, or may be connected to another type of network or remote computer system (not shown) by using the network interface unit 1111.

The memory further includes at least one instruction, at least one program, a code set or an instruction set. The at least one instruction, the at least one program, the code set, or the instruction set is stored in the memory, and configured to be executed by the one or more processors, to implement the foregoing recommended content selection method or interactive prediction model training method.

In an exemplary embodiment, a non-transitory computer-readable storage medium is also provided. The storage medium stores at least one instruction, at least one program, a code set, or an instruction set. The at least one instruction, the at least one program, the code set, or the instruction set, when executed by a processor, implements the foregoing recommended content selection method or interactive prediction model training method.

In some embodiments, the computer-readable storage medium may include: a ROM, a RAM, a solid state drive (SSD), an optical disc, or the like. The RAM may include a resistance random access memory (ReRAM) and a dynamic random access memory (DRAM).

In an exemplary embodiment, a computer program product or a computer program is also provided. The computer program product or the computer program includes computer instructions. The computer instructions are stored in a non-transitory computer-readable storage medium. A processor of a computer device reads the computer instructions from the computer-readable storage medium. The processor executes the computer instructions, whereby the computer device performs the foregoing recommended content selection method or interactive prediction model training method.

It is to be understood that "plurality" mentioned in the specification means two or more. "And/or" describes an association relationship between associated objects, and represents that three relationships may exist. For example, A and/or B may represent the following three cases: Only A exists, both A and B exist, and only B exists. The character "/" generally represents that contextual objects are in an "or" relationship. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application. In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A recommended content selection method performed by a computer device, the method comprising:

obtaining an input structure graph, the input structure graph comprising a plurality of user nodes and a plurality of content nodes;

generating, according to the input structure graph, fusion vectors corresponding to nodes in the input structure graph using an interactive prediction model, wherein a fusion vector corresponding to a target node among the nodes integrates feature information of the target node and feature information of a node associated with the target node;

determining, for a target user node among the plurality of user nodes, interactive prediction values between the target user node and the plurality of content nodes based on a fusion vector corresponding to the target user node and fusion vectors corresponding to the plurality of content nodes;

ranking the plurality of content nodes according to a descending order of the interactive prediction values associated with the plurality of content nodes;

selecting, according to the descending order of the interactive prediction values, a top first quantity of candidate content nodes from the plurality of content nodes to obtain a candidate content node set corresponding to the target user node;

selecting a second quantity of candidate content nodes from the candidate content node set as a recommended content node set, the second quantity being less than the first quantity, wherein the recommended content node set has a diversity index higher than any other second quantity of candidate content nodes from the candidate content node set, and the diversity index of the recommended content node set is defined as a determinant of a positive semi-definite matrix composed of the recommended content node set for representing a diversity degree of the recommended content node set;

determining a recommended content based on the recommended content node corresponding to the target user node and correlation between the recommended content and the target user node; and returning the recommended content to a terminal associated with the target user node, wherein a target application at the terminal is configured to display the recommended content to a target user.

2. The method according to claim 1, wherein the input structure graph represents associations between the user nodes and the content nodes, and the input structure graph is constructed based on historical interaction information between the user nodes and the content nodes.

3. The method according to claim 1, wherein the node associated with the target node refers to a node directly or indirectly connected to the target node through a connecting edge in the input structure graph.

4. The method according to claim 1, wherein each interactive prediction value represents an interaction possibility between the target user node and one of the content nodes.

5. The method according to claim 1, wherein the determining interactive prediction values between the target user node and the plurality of content nodes based on a fusion vector corresponding to the target user node and fusion vectors corresponding to the plurality of content nodes comprises:

calculating an inner product between the fusion vector corresponding to the target user node and a fusion vector corresponding to the target content node; and determining an interactive prediction value between the target user node and the target content node according to the inner product.

6. A computer device, comprising a processor and a memory, the memory storing a computer program, and the computer program, when loaded and executed by the processor, causing the computer device to implement a recommended content selection method including:

obtaining an input structure graph, the input structure graph comprising a plurality of user nodes and a plurality of content nodes;

generating, according to the input structure graph, fusion vectors corresponding to nodes in the input structure graph using an interactive prediction model, wherein a fusion vector corresponding to a target node among the nodes integrates feature information of the target node and feature information of a node associated with the target node;

determining, for a target user node among the plurality of user nodes, interactive prediction values between the target user node and the plurality of content nodes based on a fusion vector corresponding to the target user node and fusion vectors corresponding to the plurality of content nodes;

ranking the plurality of content nodes according to a descending order of the interactive prediction values associated with the plurality of content nodes;

selecting, according to the descending order of the interactive prediction values, a top first quantity of candidate content nodes from the plurality of content nodes to obtain a candidate content node set corresponding to the target user node;

selecting a second quantity of candidate content nodes from the candidate content node set as a recommended content node set, the second quantity being less than the first quantity, wherein the recommended content node set has a diversity index higher than any other second quantity of candidate content nodes from the candidate content node set, and the diversity index of the recommended content node set is defined as a determinant of a positive semi-definite matrix composed of the recommended content node set for representing a diversity degree of the recommended content node set;

determining a recommended content based on the recommended content node corresponding to the target user node and correlation between the recommended content and the target user node; and returning the recommended content to a terminal associated with the target user node, wherein a target application at the terminal is configured to display the recommended content to a target user.

7. The computer device according to claim 6, wherein the input structure graph represents associations between the user nodes and the content nodes, and the input structure graph is constructed based on historical interaction information between the user nodes and the content nodes.

8. The computer device according to claim 6, wherein the node associated with the target node refers to a node directly or indirectly connected to the target node through a connecting edge in the input structure graph.

9. The computer device according to claim 6, wherein each interactive prediction value represents an interaction possibility between the target user node and one of the content nodes.

10. The computer device according to claim 6, wherein the determining interactive prediction values between the target user node and the plurality of content nodes based on a fusion vector corresponding to the target user node and fusion vectors corresponding to the plurality of content nodes comprises:

calculating an inner product between the fusion vector corresponding to the target user node and a fusion vector corresponding to the target content node; and determining an interactive prediction value between the target user node and the target content node according to the inner product.

11. A non-transitory computer-readable storage medium, storing a computer program, and the computer program, when loaded and executed by a processor of a computer device, causing the computer device to implement a recommended content selection method including:

obtaining an input structure graph, the input structure graph comprising a plurality of user nodes and a plurality of content nodes;

generating, according to the input structure graph, fusion vectors corresponding to nodes in the input structure graph using an interactive prediction model, wherein a fusion vector corresponding to a target node among the nodes integrates feature information of the target node and feature information of a node associated with the target node;

determining, for a target user node among the plurality of user nodes, interactive prediction values between the target user node and the plurality of content nodes based on a fusion vector corresponding to the target user node and fusion vectors corresponding to the plurality of content nodes;

ranking the plurality of content nodes according to a descending order of the interactive prediction values associated with the plurality of content nodes;

selecting, according to the descending order of the interactive prediction values, a top first quantity of candidate content nodes from the plurality of content nodes to obtain a candidate content node set corresponding to the target user node;

selecting a second quantity of candidate content nodes from the candidate content node set as a recommended content node set, the second quantity being less than the first quantity, wherein the recommended content node set has a diversity index higher than any other second quantity of candidate content nodes from the candidate content node set, and the diversity index of the recommended content node set is defined as a determinant of a positive semi-definite matrix composed of the recommended content node set for representing a diversity degree of the recommended content node set;

determining a recommended content based on the recommended content node corresponding to the target user node and correlation between the recommended content and the target user node; and returning the recommended content to a terminal associated with the target user node, wherein a target application at the terminal is configured to display the recommended content to a target user.

12. The non-transitory computer-readable storage medium according to claim 11, wherein the input structure graph represents associations between the user nodes and the content nodes, and the input structure graph is constructed based on historical interaction information between the user nodes and the content nodes.

13. The non-transitory computer-readable storage medium according to claim 11, wherein the node associated with the target node refers to a node directly or indirectly connected to the target node through a connecting edge in the input structure graph.

14. The non-transitory computer-readable storage medium according to claim 11, wherein each interactive prediction value represents an interaction possibility between the target user node and one of the content nodes.

* * * * *